DIODE COUPLED READ AND WRITE CIRCUITS FOR FLIP-FLOP MEMORY

Filed June 7, 1967 2 Sheets-Sheet 1

INVENTORS.
DONN E. BERNHARDT
JOHN R. NOWELL

Nov. 10, 1970 D. E. BERNHARDT ET AL 3,540,005

DIODE COUPLED READ AND WRITE CIRCUITS FOR FLIP-FLOP MEMORY

Filed June 7, 1967 2 Sheets-Sheet 2

United States Patent Office 3,540,005

Patented Nov. 10, 1970

3,540,005
DIODE COUPLED READ AND WRITE CIRCUITS FOR FLIP-FLOP MEMORY

Donn E. Bernhardt and John R. Nowell, Phoenix, Ariz., assignors to General Electric Company, a corporation of New York Filed June 7, 1967, Ser. No. 644,370
Int. Cl. G11c *7/00, 11/40;* H03k *3/26*
U.S. Cl. 340—173 8 Claims

ABSTRACT OF THE DISCLOSURE

Flip-flops store data words in response to two-level input signals and two-level word selection signals without the use of coincidence logic gates. Each flip-flop employs two transistors cross-coupled to each other. The emitters of both transistors are connected to a source of synchronizing pulses and the collector of each transistor is coupled to a source of binary signals. The value of the binary signals and the value of the synchronizing pulses are selected so that the simultaneous application of binary signals and synchronizing pulses set the flip-flop to the desired state.

BACKGROUND OF THE INVENTION

The invention relates to bistable devices and more particularly to high speed flip-flops which are especially useful as memory elements in an electronic data processing system.

A prior art flip-flop is a bistable circuit which operates in either one of two stable states and has two signal input terminals, each of which corresponds with one of the two states. The flip-flop remains operating in either state until transferred to the other state by application of a trigger signal to the corresponding terminal. In one state of operation the flip-flop represents the binary 1 (1-state) and in the other state a binary 0 (0-state).

An application of the flip-flop is its use as a memory or data storage device in electronic data processing systems. Buffer memories provide temporary storage for data words being transferred to a main memory from a peripheral device, such as a magnetic tape handler. Flip-flops are especially useful in buffer memories where it is desired that data words be "written" into the buffer memory and "read" out of the buffer memory in a very short period of time. Each flip-flop stores an element of information representing a binary digit, the binary digit being termed a "bit." A data word is composed of several bits. Each bit is either a binary 0 or a binary 1.

It is desirable, in electronic data processing systems that data be read into the buffer memory and read out of the buffer memory only during the time of a synchronizing pulse. Thus, buffer memories employing prior art flip-flops require, in addition, a pair of input coincidence gates and a pair of output coincidence gates, for each flip-flop. These coincidence gates used in prior art circuits prevent a bit from being written into a flip-flop or read out of a flip-flop until a synchronizing pulse is applied to one of the coincidence gates. Such circuits, however, cause the memory to be bulky and expensive to construct.

Other prior art memories employ flip-flops and a source of three-level clock pulses. A first level of clock pulses causes the data to be written into the flip-flops, a second level of clock pulses holds the data in the flip-flops and a third level of clock pulses causes the data to be read from the flip-flops. Such a source of three-level pulses is bulky and expensive to construct. The flip-flops used in these prior art memories also require separate signal input and output terminals for each flip-flop. It is desirable, therefore, to provide an improved high speed memory having a greatly simplified circuit construction.

It is therefore an object of this invention to provide an improved memory circuit.

Another object of this invention is to provide an improved and simplified memory circuit.

Still another object of this invention is to provide an improved memory circuit which utilizes two-level input signals.

A further object of this invention is to provide an improved memory circuit including flip-flops having terminals which function as both input and output terminals.

SUMMARY OF THE INVENTION

The foregoing objects are achieved in a flip-flop employing two transistors. The transistors are cross-coupled to each other and the emitters of both transistors are connected to an input terminal which receives synchronizing or "word selection" pulses. The collector of each transistor is coupled to a corresponding output terminal. Each of the output terminals is connected to a corresponding input terminal of a differential amplifier which senses the state of the flip-flop. Each of the flip-flop output terminals is also coupled to a source of binary signals which provides binary signals to the flip-flop output terminals. The value of the binary signals and the value of the word selection pulses are selected so that the combination of a binary signal and a word selection pulse applied simultaneously to the flip-flop sets the flip-flop to a state which represents that of the binary signal.

Other objects and advantages of this invention will become apparent from the following description when taken in connection with the accompanying drawings.

DESCRIPTION OF THE PREFERRED EMBODIMENT

Figure 1:
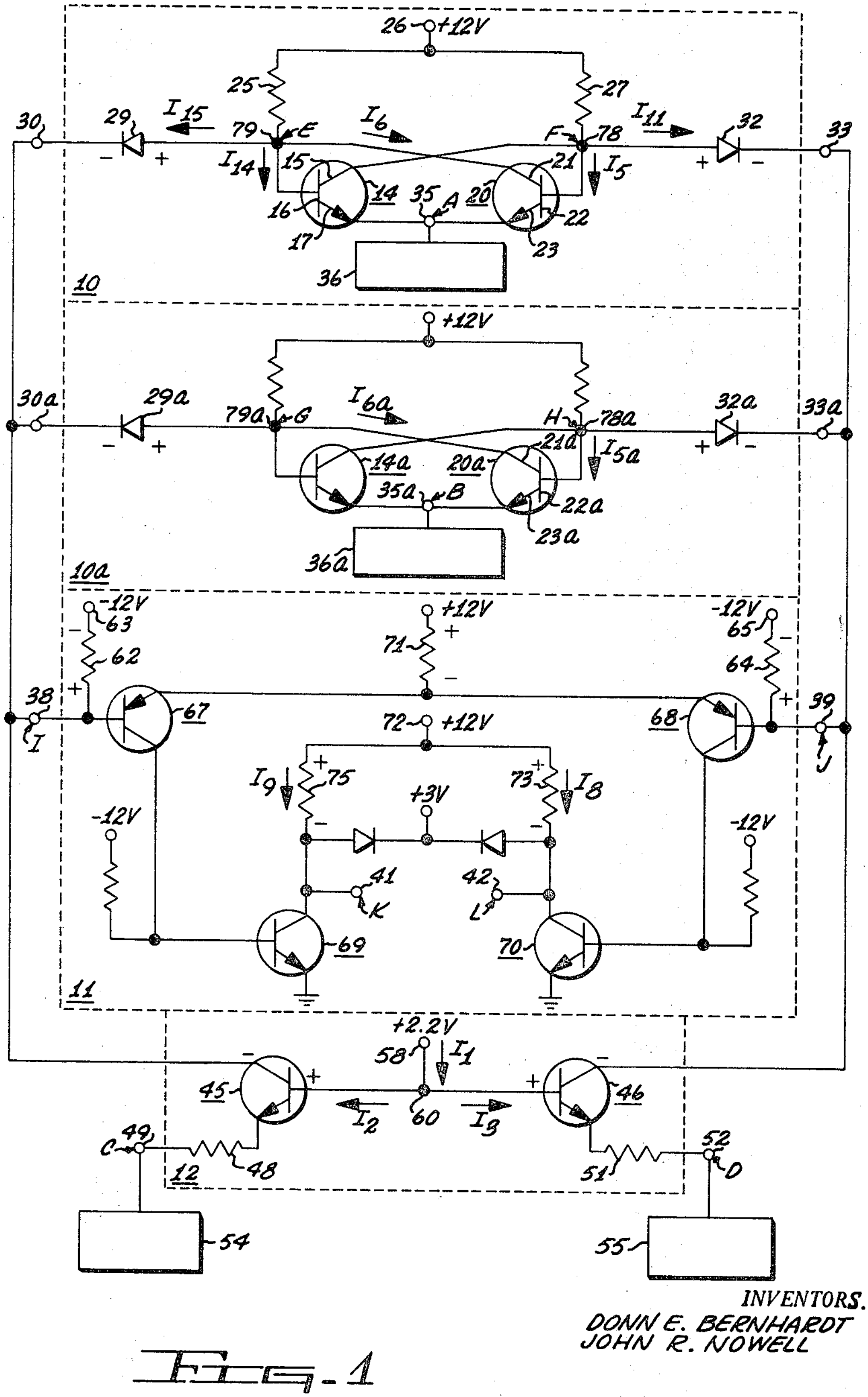
FIG. 1 is a schematic drawing of the instant invention.

The memory circuit shown in FIG. 1 includes only a pair of flip-flops 10 and 10*a* but it should be understood that any reasonable number of flip-flops may be provided. In one typical application in an electronic data processing system twelve such flip-flops are used in each of the memory circuits. Several such memory circuits may be used in a memory of an electronic data processing system. The memory circuit shown also includes a read amplifier 11 and a write driver 12. Each of the memory flip-flops comprises a transistor 14 having a first output electrode or collector 15, a control electrode or base 16 and a second output electrode or emitter 17 and a transistor 20 having a first output electrode or collector 21, a control electrode or base 22 and a second output electrode or emitter 23. The transistors are cross-coupled with collector 21 of transistor 20 connected to base 16 of transistor 14 and collector 15 of transistor 14 connected to base 22 of transistor 20. A resistor 25 is connected between collector 21 and a terminal 26 which is connected to a suitable source of positive potential, such as +12 volts. A resistor 27 is connected between collector 15 and terminal 26. A first diode 29 is connected between collector 21 and a first output terminal 30. A second diode 32 is connected between collector 15 and a second output terminal 33. Emitters 17 and 23 of transistors 14 and 20 are each connected to an input terminal 35 which is connected to a source of word selection pulses 36.

Memories which use a plurality of the memory circuits shown in FIG. 1 may connect each source of word selection pulses to a plurality of flip-flops. For example, in one typical application, a source of word selection pulses 36 is connected to the input terminals 35 of twenty-six flip-flops so that a data word having twenty-six bits is selected each time the source 36 provides a word selection pulse.

The read amplifier 11 is a differential amplifier having a pair of signal input terminals 38 and 39 and a pair of output terminals 41 and 42. The first signal input terminal 38 is connected to each of the output terminals 30 and 30*a* of the flip-flops 10 and 10*a*. The second signal input terminal 39 is connected to each of the output terminals 33 and 33*a* of the flip-flops 10 and 10*a*. A differential amplifier is an amplifier having first and second signal input terminals and first and second output terminals. The voltage received at the first input terminal is compared with the voltage received at the second input terminal and the amplifier produces voltages at the output terminals which are determined by the difference between the voltages at the first and second input terminals. When the input signals to terminals 38 and 39 have the same voltage value, output terminals 41 and 42 each have the same voltage value. When the value of voltage at terminal 38 is larger than the value of voltage at input terminal 39, the value of voltage at first signal output terminal 41 is larger than the value of voltage at second output terminal 42. When the value of voltage at input terminal 39 is larger than the value of voltage at input terminal 38, the value of voltage at output terminal 42 is larger than the value of voltage at output terminal 41.

The write-driver 12 includes a pair of transistors 45 and 46 each havng a control electrode or base, a first output electrode or collector and a second output electrode or emitter. The collector of transistor 45 is connected to the input terminal 38 of the differential amplifier 11 and the collector of transistor 46 is connected to the input terminal 39 of the differential amplifier 11. A resistor 48 is connected between the emitter of transistor 45 and a 0-input terminal 49. A resistor 51 is connected between the emitter of transistor 46 and a 1-input terminal 52. A first source of binary signals 54 is connected to input terminal 49 and a second source of binary signals 55 is connected to input terminal 52. A suitable source of positive potential, such as +2.2 volts is connected to the bases of transistors 45 and 46.

When it is desired to read the information stored in a predetermined flip-flop, a "word selection" pulse is applied to the input terminal of the flip-flop. When it is desired to write information into a predetermined flip-flop, a signal is applied to either the "1" input terminal or the "0" input terminal of the write driver and a word selection pulse is simultaneously applied to the input terminal of the flip-flop. Word selection pulses of one voltage polarity are used to perform both the read operation and the write operation. Prior art memory circuits require a pulse of one voltage polarity to perform the read operation and a pulse of the opposite voltage polarity to perform the write operation.

Figure 2:
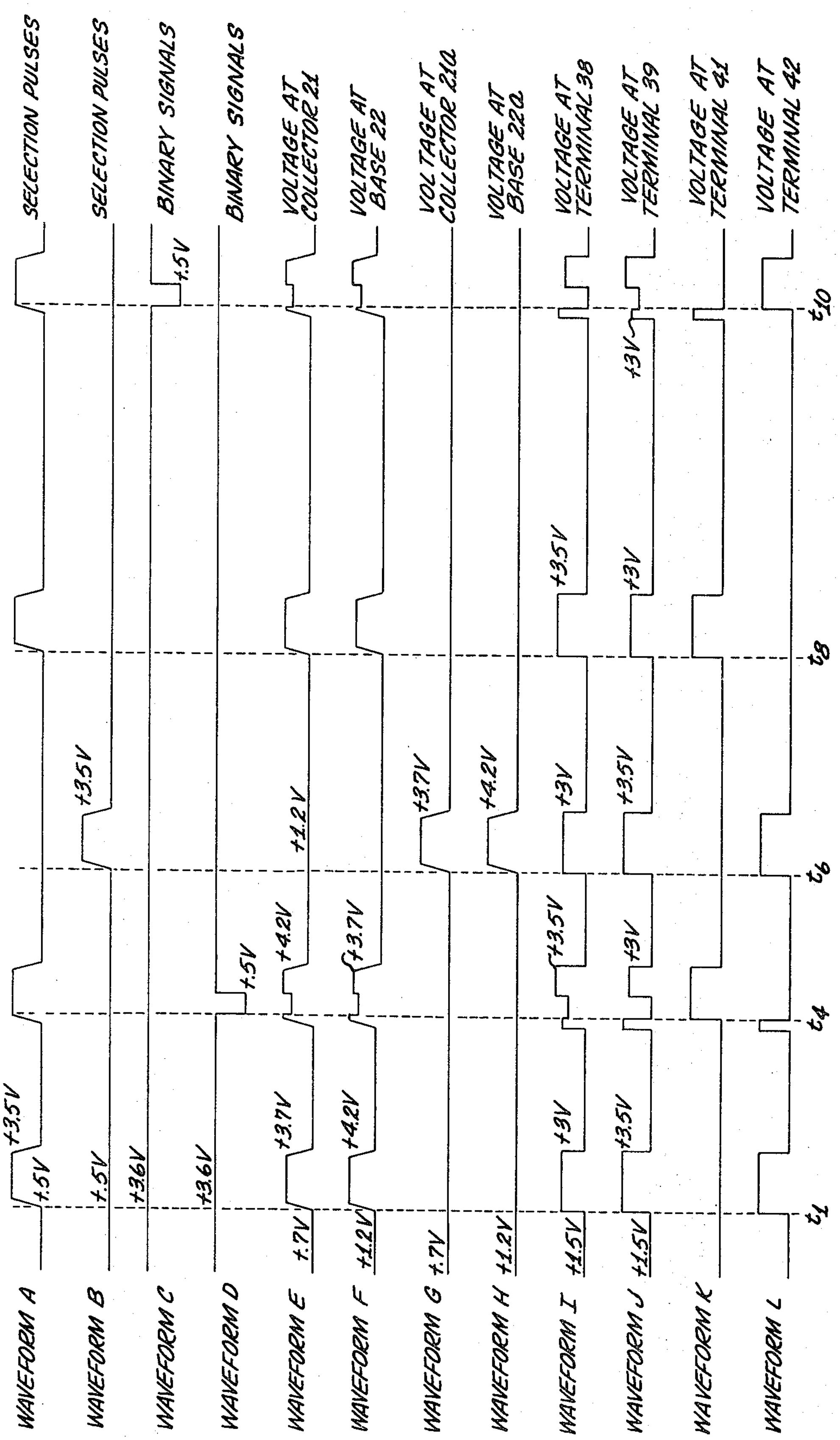
FIG. 2 illustrates waveforms which are useful in explaining the operation of the circuit in FIG. 1.

The operation of the memory circuit will now be described in connection with the waveforms shown in FIG. 2. Prior to time $t_1$ of FIG. 2, data is stored in flip-flops 10 and 10*a* but no read or no write operation is performed. When a flip-flop is in the 0-state, transistor 20 is conducting and transistor 14 is nonconducting. When the flip-flop is in the 1-state, transistor 14 is conducting and transistor 20 is nonconducting. Assume that prior to time $t_1$ of FIG. 2 that transistors 14 and 14*a* are each nonconductive and transistors 20 and 20*a* are each conductive so that flip-flops 10 and 10*a* are each in the 0-state. Prior to time $t_1$ the sources of word selection pulses 36 and 36*a* and the source of binary signals 54 and 55 each produce a steady value of voltage so that no pulses are being applied to any of the input terminals 35, 35*a*, 49 and 52. The input signals at terminal 35 and 35*a* are represented by the waveforms shown in waveform A and waveform B respectively. The input signals at terminals 49 and 52 are shown in waveform C and waveform D respectively of FIG. 2. The voltages applied to input terminals 49 and 52 are each more positive than the +2.2 volts applied to terminal 58 so that the base of transistor 45 and the base of transistor 46 is each less positive than the emitter, thus there is no current flow between the base and emitter of either transistor 45 or transistor 46. The voltage at the bases of transistors 45 and 46 however, is more positive than the voltage applied to the collectors of transistors 45 and 46 so that a current $I_1$ flows from terminal 58 to junction point 60 where it divides. A current $I_2$ flows from junction point 60 through the base to collector of transistor 45, to input terminal 38 of the differential amplifier, through a resistor 62 to terminal 63. Another current $I_3$ flows from junction point 60 through the base to collector of transistor 46, to input terminal 39 of the differential amplifier, through resistor 64 to terminal 65.

When current flows from base to collector of a transistor, such as transistors 45 and 46, the voltage drop between the base and the collector is approximately +.7 volt. The voltage drop between the base and the collector of the transistors, subtracts from the +2.2 volts at terminal 58 so that the voltage at collectors of transistors 45 and 46 and at each of the input terminals 38 and 39 of the differential amplifier 11 is approximately +1.5 volts. These voltages at input terminals 38 and 39 cause transistors 67 and 68 to each conduct the same amount which causes transistors 69 and 70 to each conduct the same amount so that the voltage at output terminal 41 is substantially equal to the voltage at output terminal 42. The voltages at terminals 38 and 39 are shown in waveform I and waveform J respectively of FIG. 2. The voltages at terminals 41 and 42 are shown in waveforms K and L respectively.

Prior to time $t_1$ a current $I_5$ flows from terminal 26 in flip-flop 10, through resistor 27 to base 22 of transistor 20, through base 22 and emitter 23 to terminal 35. Current $I_5$ renders transistor 20 conductive so that a current $I_6$ flows from terminal 26 through resistor 25 to collector 21 of transistor 20, through collector 21 and emitter 23 to terminal 35. When transistor 20 is conductive, the voltage between base 22 and emitter 23 is approximately +.7 volt. The +.5 volt at emitter 23 and the +.7 volt between base 22 and emitter 23 cause the voltage at base 22 of transistor 20 to be +1.2 volts. When transistor 20 is conductive, the voltage between collector 20 and emitter 23 is approximately +.2 volt. The +.5 volt at emitter 23 and the +.2 volt between collector 20 and emitter 23 cause the voltage at collector 21 of transistor 20 to be +.7 volt. The voltage at base 22 and at collector 21 of transistor 20 is each less positive than the voltage at input terminals 38 and 39 of the differential amplifier 11 so that diodes 29 and 32 are each back-biased, thus causing diodes 29 and 32 to each be an open circuit. The voltages at base 22 and at collector 21 are shown in waveforms E and F respectively. Prior to time $t_1$ transistor 20*a* is conductive so that the voltage at base 22*a* and at collector 21*a* is each less positive than the voltage at terminals 38 and 39 of amplifier 11 so that diodes 29*a* and 33*a* are each back-biased. The voltage at base 22*a* and at collector 21*a* are shown in waveforms G and H respectively.

At time $t_1$ a read operation is performed in the memory circuit of FIG. 1. The voltage from the source of selection pulses 36 increases from a +.5 volt to a +.3.5 volts thereby causing the base 22 and the emitter 21 of transistor 20 to increase a like amount. The voltage at base 22 of transistor 20 is +4.2 volts and the voltage at collector 21 of transistor 20 is +3.7 volts. This causes the voltage at the anodes of diodes 29 and 32 to be more positive than the voltage at the cathodes of these diodes so that diode 29 and diode 32 are each rendered conductive. When these diodes are rendered conductive, there is a voltage drop of approximately +.7 volt between the anode and the cathode of each of the diodes 29 and 32. This causes the voltage at input terminals 38 and 39 of the differential amplifier 11 to be approximately a +3 volts and +3.5 volts respectively. The +3 volts at terminal 38 and the +3.5 volts at terminal 39 prevent current from flowing from the base to the collector of transistors 45 and 46 in write-driver 12. The larger voltage at input terminal 39 causes transistor 68 in read amplifier 11 to conduct less heavily than transistor 67 which, in turn, causes transistor 70 to conduct less heavily than transistor 69.

When transistor 70 is rendered conductive, a current $I_8$ flows from terminal 72 through resistor 73 through collector to emitter of transistor 70. Current $I_8$ produces the voltage drop shown across resistor 73. At this same time a current $I_9$ flows from terminal 72 through resistor 75, through collector to emitter of transistor 69. Current $I_9$ produces the voltage drop shown across resistor 75. The relatively large current $I_9$ produces a relatively large voltage drop across resistor 75. This voltage drop substracts from the voltage at terminal 72 so the voltage at output terminal 41 is relatively low. Since the current through resistor 73 has a smaller value than the current through resistor 75, there is a smaller voltage drop across resistor 73 and the voltage at output terminal 42 is higher than the voltage at output terminal 41. Thus, each time a word selection pulse is applied to input terminal 35 the differential amplifier 11 provides an output voltage which indicates the state of the flip-flop 10. Each time a word selection pulse is applied to input terminal 35*a* of flip-flop 10*a*, the differential amplifier provides an output voltage which indicates the state of the flip-flop 10*a*. It is possible to check the state of only one of the flip-flops at a time.

Semiconductor materials used in transistors, such as the transistors which are employed in the flip-flops of FIG. 1, store electrical charges during the time a transistor is in a conductive condition. These charges must be supplied to a transistor in order to render the transistor conductive. These electrical charges must be removed to render a transistor nonconductive after it has been conductive. Electrical current flowing into the base of a transistor supplies electrical charges to the transistor. Electrical current flowing out of the base of a transistor removes these electrical charges from the transistor. The word selection pulse applied to terminal 35 of the flip-flop at time $t_1$ does not supply electrical charges to the base of the transistors and does not remove electrical charges. Thus, the application af a word selection pulse does not change the state of the flip-flop to which it is applied. Information can be read from the flip-flop without destroying the information in the flip-flop.

At time $t_4$ a write operation is performed in the memory circuit. The +3.5 volt word selection pulse at terminal 35 and the +.5 volt representing a binary signal at terminal 52 cause flip-flop 10 to change to the 1-state. The voltage applied to terminal 52 causes a current $I_{10}$ to flow from terminal 58, through base to emitter of transistor 46, through resistor 51 to terminal 52. Current $I_{10}$ from base to emitter of transistor 46 renders transistor 46 conductive. The positive word selection pulse applied to input terminal 35 of flip-flop 10 causes the voltage at junction point 78 to increase so that diode 32 is rendered conductive as discussed above. When transistor 46 is rendered conductive, a current $I_{11}$ flows from terminal 26 in flip-flop 10 through resistor 27 and diode 32 to the collector of transistor 46, from the collector to emitter of transistor 46, through resistor 51 to input terminal 52. This current $I_{11}$ produces a voltge drop across resistor 27 which subtracts from the voltage at terminal 26. The voltage drop across resistor 27 causes the voltage at the base 22 of transistor 20 to be less positive than the voltage at emitter 23. The decreased value of voltage at the 1-input terminal 52 causes the voltage at junction point 78 in flip-flop 10 to be lower than the voltage at junction point 79 so that a current $I_{12}$ flows from junction point 79 to collector 21 of transistor 20, from collector 21 to base 22 of transistor 20 to junction point 78. A current $I_{13}$ flows from terminal 35 to emitter 23 of transistor 20, from emitter 23 to base 22, to junction point 78. Currents $I_{12}$ and $I_{13}$ which flow out of base 22 remove electrical charges from transistor 20 so that transistor 20 is rendered nonconductive. Also at time $t_4$ a current $I_{14}$ flows from junction point 79 through base 16 and collector 15 of transistor 14 to junction point 78. Current $I_{14}$ provides electrical charges which are stored in transistor 14. These charges cause transistor 14 to become conductive so that the flip-flop will operate in the 1-state when the voltage at terminal 35 returns to a +.5 volt value. Thus, the combination of the binary pulse at terminal 52 and the word selection pulse at input terminal 35 render transistor 20 nonconductive and render transistor 14 conductive so that flip-flop 10 changes from the 0-state to the 1-state.

At time $t_6$ the information stored in flip-flop 10*a* is read from flip-flop 10*a*. A word selection pulse is applied to the input terminal 35*a* of flip-flop 10*a* thereby raising the voltages on the emitters and on the collectors of transistors 14*a* and 20*a*. Since transistor 20*a* is conductive at this time, the voltage at junction point 78*a* is more positive than the voltage at junction point 79*a* thereby causing the input voltage at terminal 39 of the differential amplifier to be more positive than the input voltage at terminal 38 of the differential amplifier 11. The less positive voltage at terminal 38 causes transistor 67 to conduct more heavily than transistor 68 which causes transistor 69 to conduct more heavily than transistor 70.

Current $I_9$ through resistor 75 and transistor 69 produces a relatively large voltage drop across resistor 75. This voltage drop subtracts from the voltage at terminal 72 so that the voltage at output terminal 41 is relatively low. Curren $I_8$ through resistor 73 and transistor 70 produces a relatively small voltage drop across resistor 73. This voltage drop subtracts from the voltage at terminal 72 so that the voltage at output terminal 42 is relatively high.

A time $t_{10}$ a write operation is again performed in the memory circuit. The +3.5 volt word selection pulse at terminal 35 and the +.5 volt representing a binary signal at terminal 49 cause flip-flop 10 to change to the 0-state. The voltage applied to terminal 49 causes a current to flow from terminal 58 through base to emitter of transistor 46, through resistor 48 to terminal 49. This current from base to emitter of transistor 45 renders transistor 45 conductive. The positive word selection pulse applied to input terminal 35 of flip-flop 10 causes the voltage at junction point 79 to increase so that diode 29 is rendered conductive as discussed above. When transistor 45 is conductive, a current $I_{15}$ flows from terminal 26 in flip-flop 10, through resistor 25 and diode 29 to the collector of transistor 45, from the collector to emitter of transistor 45, through resistor 48 to input terminal 49. This current $I_{15}$ produces a voltage drop across resistor 25 which subtracts from the voltage at terminal 26. The voltage drop across resistor 25 causes the voltage at the base 16 of transistor 14 to be less positive than the voltage at emitter 17. The decreased value of voltage at the 0-input terminal 49 causes the voltage at junction point 79 in flip-flop 10 to be lower than the voltage at junction point 78 so that a current $I_{16}$ flows from junction point 78 to collector 15 of transistor 14, from collector 15 to base 16 of transistor 14, to junction point 79. A current $I_{17}$ flows from terminal 35 to emitter 17 of transistor 14, from emitter 17 to base 16, to junction point 79. Currents $I_{16}$ and $I_{17}$ which flow out of base 16 remove electrical charges from transistor 14 so that transistor 14 is rendered nonconductive. Also at time $t_{10}$ a currennt $I_{18}$ flows from junction point 78 through base 22 and collector 21 of transistor 20 to junction point 79. Current $I_{18}$ provides electrical charges which are stored in transistor 20. The charges cause transistor 20 to become conductive so that the flip-flop will operate in the 0-state when the voltage at terminal 35 returns to a +.5 volt value. Thus, the combination of the binary pulse at terminal 49 and the word selection pulse at terminal 35 render transistor 14 nonconductive and render transistor 20 conductive so that flip-flop 10 changes from the 1-state to the 0-state.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

We claim:

1. A memory flip-flop comprising: first and second transistors each having a collector, an emitter, and a base; means for cross-coupling said first and second transistors to form a bistable switch; a source of selection pulses; means for applying said selection pulses to the emitters of said first and second transistors; first and second sources of binary signals; means for coupling said first source to said collector of said first transistor, means for coupling said second source to said collector of said second transistor; a differential amplifier having first and second input terminals and first and second output terminals; first diode means for coupling said first input terminal to said collector of said first transistor; and second diode means for coupling said second input terminal to said collector of said second transistor.

2. A memory flip-flop comprising: first, second, third and fourth transistors each having a collector, an emitter and a base; means for cross-coupling said first and second transistors to form a bistable switch; a source of selection pulses; means for applying said selection pulses to the emitters of said first and second transistors; a differential amplifier having first and second input terminals and first and second output terminals; first and second diodes, said first diode being connected between said collector of said first transistor and said first input terminal of said amplifier, said second diode being connected between said collector of said second transistor and said second input terminal of said amplifier; first and second sources of binary signals; means for coupling said first source to said emitter of said third transistor, said collector of said third transistor being connected to said first input terminal of said amplifier; means for coupling said second source to said emitter of said fourth transistor, said collector of said fourth transistor being connected to said second input terminal of said amplifier; and a reference potential, said bases of said third and fourth transistors being coupled to said potential.

3. A memory flip-flop as defined in claim 2 wherein: said first and said second sources of binary signals each provide a first voltage value to represent a binary 1 and a second voltage value to represent a binary 0, and wherein said reference potential provides a value of voltage between said voltage which represents a binary 1 and said voltage which represents a binary 0.

4. A memory circuit comprising a plurality of flip-flops each including: first and second transistors each having a collector, an emitter and a base; means for cross-coupling said first and second transistors to form a bistable switch; an input terminal and first and second output terminals; first and second diodes, said first diode being connected between said collector of said first transistor and said first output terminal, said second diode being connected between said collector of said second transistor and said second output terminal, said emitters of said first and second transistor being connected to said input terminal; and wherein said memory circuit includes: a plurality of sources of selection pulses; means for coupling each of said sources to a corresponding one of said input terminals; a differential amplifier having first and second input terminals and first and second output terminals; means for connecting said first input terminal of said amplifier to the first output terminal of each of said flip-flops; means for connecing said second input terminal of said amplifier to the second output terminal of each of said flip-flops; first and second sources of binary signals; third and fourth transistors each having a collector, an emitter and a base; and a reference potential, said bases of said third and fourth transistors being coupled to said reference potential, said collector of said third transistor being connected to said first output terminal of each of said flip-flops, said emitter of said third transistor being connected to said first source of binary signals, said collector of said fourth transistor being connected to said second output terminal of each of said flip-flops, and said emitter of said fourth transistor being connected to said second source of binary signals.

5. A memory circuit comprising: a plurality of flip-flops each having an input terminal and first and second output terminals; a plurality of sources of selection pulses; means for coupling each of said sources to a corresponding one of said input terminals; a differential amplifier having first and second input terminals and first and second output terminals; means for connecting said first input terminal of said amplifier to the first output terminal of each of said flip-flops; means for connecting said second input terminal of said amplifier to the second output terminal of each of said flip-flops; first and second sources of binary signals; first unidirectional conducting means for coupling said first source of binary signals to said first output terminal of each of said flip-flops; and second unidirectional means for coupling said second source of binary signals to said second output terminal of each of said flip-flops.

6. A memory circuit as defined in claim 5 wherein each of said flip-flops comprise: first and second transistors each having a collector, an emitter and a base; means for cross-coupling said first and second transistors to form a bistable switch; first and second diodes, said first diode being connected between said collector of said first transistor and said first output terminal of said flip-flop, said second diode being connected between said collector of said second transistor and said second output terminal of said flip-flop, said emitters of said first and second transistors being connected to said input terminal of said flip-flop.

7. A memory circuit as defined in claim 5 wherein: said first unidirectional conducting means includes a third transistor having a collector, an emitter and a base; and said second unidirectional conducting means includes a fourth transistor having a collector, an emitter and a base, and wherein said memory circuit includes a reference potential, said reference potential being connected to said bases of said third and fourth transistors, said collector of said third transistor being connected to said first output terminal of each of said flip-flops, said emitter of said third transistor being connected to said first source of binary signals, said collector of said fourth transistor being connected to said second output terminal of each of said flip-flops, and emitter of said fourth transistor being connected to said source of binary signals.

8. A memory circuit as defined in claim 5 wherein: said first unidirectional conducting means includes a third transistor having a collector, an emitter and a base; and said second unidirectional conducting means includes a fourth transistor having a collector, an emitter and a base, said first and second source of binary signals each provide a first voltage value to represent a binary 1 and a second voltage value to represent a binary 0, and wherein said memory circuit includes a reference potential, said reference potential being connected to said bases of said third and fourth transistors, said reference potential provides a value of voltage between said voltage which represents a binary 1 and said voltage which represents a binary 0, said collector of said third transistor being connected to said first output terminal of each of said flip-flops, said emitter of said third transistor being connected to said first source of binary signals, said collector of said fourth transistor being connected to said second output terminal of each of said flip-flops, and emitter of said fourth transistor being connected to said second source of binary signals.

References Cited

UNITED STATES PATENTS

| | | | |
|---|---|---|---|
| 3,181,131 | 4/1965 | Pryor et al. | 340—174 |
| 3,215,854 | 1/1965 | Mayhew | 307—235 |
| 3,354,440 | 11/1967 | Farber et al. | 340—173 |
| 3,418,639 | 12/1968 | Lee | 307—291 X |
| 3,423,137 | 1/1969 | Harper | 340—173 |
| 3,218,613 | 11/1965 | Gribble et al. | 340—173 |
| 3,447,137 | 5/1969 | Feuer | 340—173 |

BERNARD KONICK, Primary Examiner

J. F. BREIMAYER, Assistant Examiner

U.S. Cl. X.R.

307—291, 292, 238